R. D. SMITH.
AIR BRAKE ALARM SIGNAL.
APPLICATION FILED JUNE 15, 1917.
1,279,927.
Patented Sept. 24, 1918.
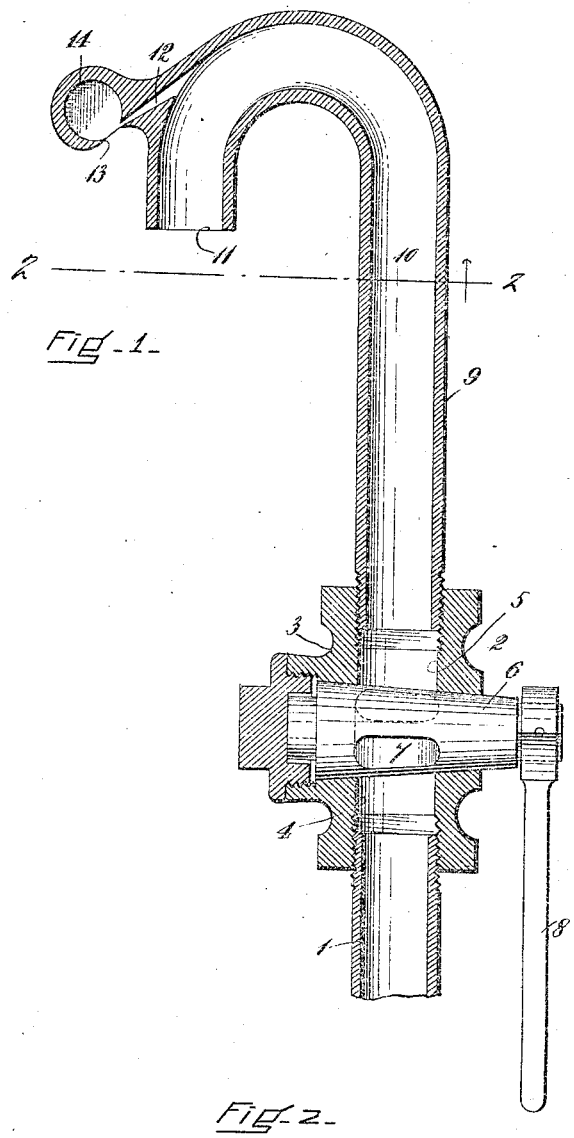
Fig. 1.
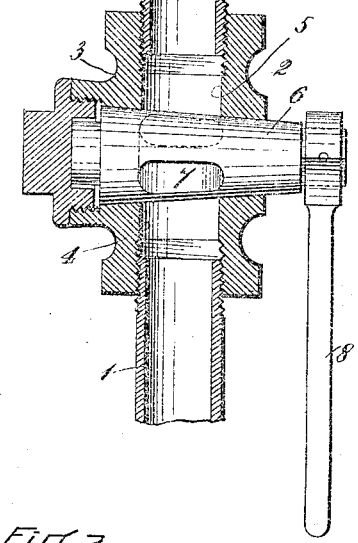
Fig. 2.
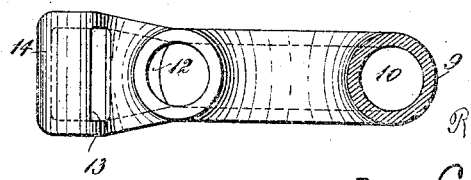
INVENTOR=
Robert D. Smith
By Coake & Hayes
HIS ATTORNEYS=

UNITED STATES PATENT OFFICE.

ROBERT D. SMITH, OF BROOKLINE, MASSACHUSETTS.

AIR-BRAKE ALARM-SIGNAL.

1,279,927. Specification of Letters Patent. Patented Sept. 24, 1918.

Application filed June 15, 1917. Serial No. 175,017.

*To all whom it may concern:*

Be it known that I, ROBERT D. SMITH, of Brookline, in the county of Norfolk and State of Massachusetts, a citizen of the United States, have invented a new and useful Improvement in Air-Brake Alarm-Signals, of which the following is a specification, reference being had to the accompanying drawings, forming a part of this specification, in explaining its nature.

The present invention relates to an alarm signal for air brakes, and is especially designed to be used at the end of a train as a warning when the train is backing up.

The essential object of my invention is to produce an efficient device, easily controllable, and at a relatively small cost.

My invention can best be seen and understood by reference to the drawings, in which—

Figure 1 is an endwise cross section of the usual pipe connection at the end of a brake system and my improved device fitted thereto, and Fig. 2 is a combined section and plan taken on the line 2—2 of Fig. 1.

Referring to the drawings:—

1 represents the usual pipe connection at the end of a brake system, and 2 the cock controlling the exit of air therefrom. The cock 2 comprises a chambered casing 3 having inlet and outlet passages 4 and 5, respectively, controlled by a plug 6 arranged to turn within the chamber of the casing and having a passage 7 through it which connects the inlet and outlet passages 4 and 5 when the cock is open. The plug 6 is controlled by a handle 8 secured to it. The pipe 1 connects with the inlet side of the valve casing, and connecting with its outlet side by a common threaded connection into the outlet passage 5 thereof, is a pipe 9 having a turned end in the nature of a gooseneck. This pipe 9 is one commonly employed in brake systems where no alarm is used and forms simply an outlet pipe beyond the cock through which the air is directed to pass or exit. Inasmuch as my present invention centers around this pipe or similar connection, attention is directed to it as follows:—

10 represents the interior or chamber of the pipe 9 which is utilized to form an air pressure chamber for purposes later to be explained. 11 is the opening at the end of the pipe 9 which preferably is unrestricted and of the same size as the bore of the pipe.

Proceeding from the pipe 9 at a point back of the opening 11 in the end thereof is a port 12 through which a thin air current may pass from the chamber 10 of the pipe. Beyond this port is a sharp edge 13 forming part of a resonating chamber 14, the combined parts making a whistle formed preferably integral with the pipe 9.

The operation is as follows:—

Upon opening the cock 2 for setting the brakes the air will be discharged through the pipe 10 and outlet through the end 11 thereof in the usual manner. The passage of air through the pipe thus occasioned will exert no influence to blow the whistle owing to the relatively large uninterrupted outlet to the pipe as compared with the size of the port 12 leading to the whistle. Assuming the cock to be closed, the whistle is blown in the following manner: The operator places his thumb or finger over the opening 11 in the end of the pipe 9 through which the air is normally discharged. At the same time he opens the cock slightly permitting the air to pass into the pipe 9 but in an amount insufficient to set the brakes. Owing to the closing of the end of this pipe and owing, also, to the fact that the port 12 provides an opening of lesser area than the area of the cock through which air is entering, pressure of air will immediately be built up within the chamber 10 of the pipe 9 and consequently under pressure thus obtained air will issue through the port 12 to break upon the sharp edge 13, causing vibration of this edge and effecting the sounding of the whistle according to the usual operation of whistles of this kind. The sounding of the whistle may be stopped immediately either by closing the cock or by the removal of the hand of the operator from the end of the pipe 9.

Having thus fully described my invention, I claim and desire to secure by Letters Patent of the United States:—

1. An alarm signal for brake systems comprising a valve for controlling the passage of air, a chambered member beyond the valve into and through which air admitted by the valve is directed to pass, said member having an outlet and also a port through which a current of air may be directed out of the chambered interior of said member upon the development of pressure of air therein, and a whistle, the arrangement being such that when the valve is open air may freely discharge through said chambered member and through the outlet thereof for setting the brakes and may be discharged through said port for blowing the whistle upon closing the outlet of said chambered member and admitting air by said valve into said chambered member in an amount insufficient to set the brakes.

2. An alarm signal for brake systems comprising a valve for controlling the passage of air, a whistle, a chambered member beyond the valve into and through which air admitted by the valve is directed to pass, said member having an outlet through which when open the air may freely discharge from said member when the valve is open, said member having also within it a port through which a jet of air may be discharged from the chambered interior of said member upon the development of pressure of air therein for blowing said whistle, said port presenting an opening so restricted that pressure of air may be developed within said chambered member for blowing the whistle when said outlet is closed and air is being admitted by said valve in an amount insufficient to set the brakes.

3. An alarm signal for brake systems consisting of a valve for controlling the discharge of air, an air discharge pipe into and through which air admitted by the valve is directed to pass, a whistle carried by the pipe, said pipe having an outlet through which air may freely discharge from said pipe when the valve is open for setting the brakes, said pipe having also a port leading from the chamber thereof and through which a jet of air may be discharged from the pipe for blowing the whistle when the outlet from the pipe is closed and the valve partially open.

ROBERT D. SMITH.

Copies of this patent may be obtained for five cents each, by addressing the "Commissioner of Patents, Washington, D. C."